March 12, 1963

A. GÜNTHER ET AL 3,080,635

STRAP FASTENER

Filed Nov. 1, 1960

ALFRED GÜNTHER
HEINRICH DÖRRE
EVELYN THIEME
*INVENTORS*

BY

*Karl F. Ross*

AGENT

3,080,635
STRAP FASTENER

Alfred Günther, Pfaffendorferstr. 17, Dresden A17, Germany; Heinrich Dörre, Talstr. 6, Sebnitz, Saxony, Germany; and Evelyn Thieme, geb. Haufe, Bischofswerdaerstr. 3, Pulsnitz, Saxony, Germany
Filed Nov. 1, 1960, Ser. No. 66,648
3 Claims. (Cl. 24—230)

The present invention relates to a strap-fastener, usually of plastic material, to be employed particularly for brassières, bodices and similar ready-to-wear goods.

Various types of strap-fastener are provided for ready-made goods, primarily using hook fasteners made of metal. Up to now these hook-type fasteners have also been utilized for brassières and similar articles.

When stamping these metal-type fasteners, sharp edges develop which tend to damage the cloth tape or rubber tape when in use, resulting in the rapid wear of the straps. Damages also develop owing to the hook bending up and because of displacement of the strap in the fastener loop. Besides this, there is the tendency that these metal-type fasteners corrode because of the influence of perspiration and necessary laundering. In addition, fasteners of this type do not lend themselves to lasting color adaptation in conformity with the undergarments of the wearer.

The instant invention eliminates the mentioned disadvantages. The invention presents a fastener for ready-made goods, in particular, brassières, bodices and the like, which is corrosion-proof, dependable and easy to use. The fastener can be manufactured in pleasing form and in any variety of colors, and will not wear out the fastening strap.

According to the invention herein disclosed, this is accomplished by providing both fastener components with complementary tongue and groove formations of resilient construction and with positive interengagement. Advantageously, stops are provided on the fastener components, in order to avoid that the fastener opens by itself when in closed condition.

In order to facilitate the insertion of the tongues of the fastener components, the corners of the ends of the tongues and/or the grooves receiving same are rounded or bent up. The grooves are open on both ends, thus enabling insertion of the fastener tongues from either end.

The sides of the tape bar of the fastener components are appropriately reinforced, reducing the tendency of the strap to become displaced on the strap bar. The strap bar itself is preferably provided with ridges or otherwise constructed with an uneven surface.

The invention will be described further, by way of an example, with reference to the accompanying drawing in which:

FIG. 1 is a front view of the complete strap fastener with the tape sewn on;

Figure 1:
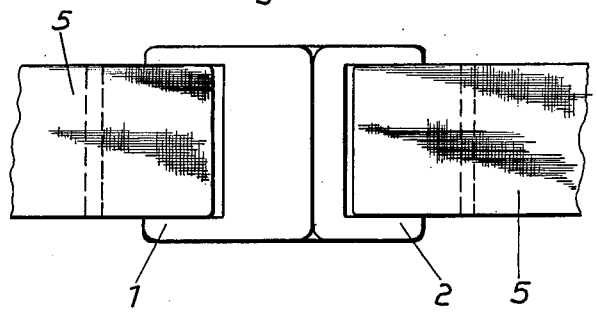
Figure 2:
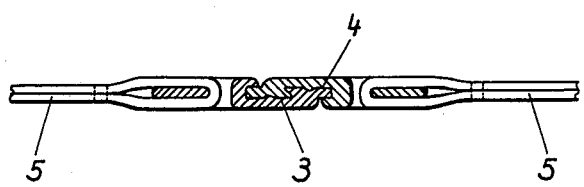
FIG. 2 is a longitudinal section of the fastener shown in FIG. 1.
Figure 3:
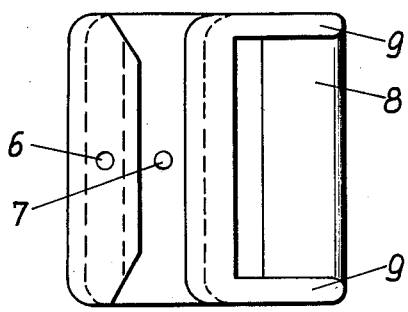
FIG. 3 is a rear view of one of the fastener components, drawn in an enlarged scale.
Figure 5:
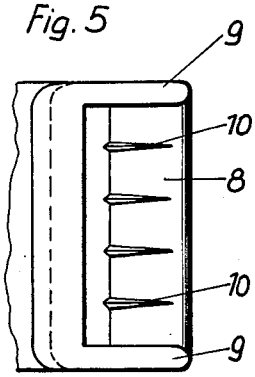
FIG. 5 is a partial view of a fastener component with roughened strap bar.
Figure 4:
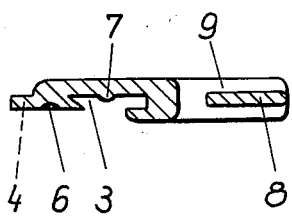
FIG. 4 is a longitudinal section of the component shown in FIG. 3.

The two fastener components 1 and 2 are constructed of plastic material and resemble each other. The fastener components are provided each with one undercut groove 3 and with one slide-in tongue 4. The latter is laterally inserted in such a manner that the tongue 4 engages the groove 3. The undercut cross-section of the groove 3 and the mating shape of tongue 4 positively interlocks the parts against relative displacement in the direction of the pull of the straps 5.

Each fastener component is provided with a recess 6, conforming to a projection 7 at the other fastener component. The strap fastener is locked in closed position by means of the recess 6 engaging the projection 7.

The groove 3 is open at both ends and on both ends provided with rounded or broken corners, in order to enable easy insertion of both fastener components 1 and 2 from either end, i.e. top and bottom.

The strap bar 8 is provided with a reinforcement bead 9 which keeps the strap 5 secure against lateral displacement. In order to improve the holding action of the strap, the strap bar 8 can be provided with ridges 10 or can be otherwise roughened.

What is claimed is:

1. The combination with a pair of straps, subject to longitudinal tensile stresses, of a strap fastener comprising a pair of substantially identical, generally flat halves of substantially rectangular outline positioned for coplanar interlocking engagement in line with said straps, each of said halves comprising a strap-engaging bar adjacent one edge transverse to said straps and a coupling portion spaced from said bar by a slot paralleling said edge, said coupling portion being provided with an undercut groove formation open at one face of the respective half while extending parallel to said edge adjacent said slot and with an adjoining tongue formation paralleling said groove formation alongside the latter while extending along another transverse edge opposite said one edge, said tongue formation being of a cross-section complementary to that of said groove formation whereby the tongue formation of each half is laterally insertable into the groove formation of the other half for mating interengagement, one of said formations of each half being provided with a surface projection, the other of said formations being provided with a surface depression yieldably engageable by the surface projection of the other half.

2. The combination according to claim 1 wherein said coupling portion is provided with transverse lips overlying said groove formation and forming the undercut thereof, the spacing between said lips increasing at the ends of said groove formation.

3. The combination according to claim 1 wherein said bar is provided with a roughened strap-retaining surface.

References Cited in the file of this patent
UNITED STATES PATENTS

| 142,527 | Starr | Sept. 2, 1873 |
|---|---|---|
| 711,961 | Griggs | Oct. 28, 1902 |
| 796,414 | Chayes | Aug. 8, 1905 |
| 1,759,550 | Friedlander | May 20, 1930 |
| 2,058,931 | Williams | Oct. 27, 1936 |
| 2,486,681 | Reiss | Nov. 1, 1949 |
| 2,523,465 | Graham | Sept. 26, 1950 |
| 2,568,969 | Reiss | Sept. 25, 1951 |

FOREIGN PATENTS

| 1,066,710 | France | June 9, 1954 |
|---|---|---|
| 29,469 | Great Britain | Dec. 27, 1906 |